United States Patent
Conner

(10) Patent No.: US 6,682,192 B2
(45) Date of Patent: Jan. 27, 2004

(54) MULTIPURPOSE LOCKING AND FASTENING DEVICE

(75) Inventor: William A. Conner, San Diego, CA (US)

(73) Assignee: MicroVision Optical, Inc., San Diego, CA (US)

( * ) Notice: Subject to any disclaimer, the term of this patent is extended or adjusted under 35 U.S.C. 154(b) by 12 days.

(21) Appl. No.: 09/963,826

(22) Filed: Sep. 25, 2001

(65) Prior Publication Data

US 2003/0058402 A1 Mar. 27, 2003

(51) Int. Cl.$^7$ ................................................. G02C 1/02
(52) U.S. Cl. .................... 351/110; 351/153; 351/143; 351/146; 16/228
(58) Field of Search .............................. 351/110, 140, 351/141, 143, 146, 153; 16/228

(56) References Cited

U.S. PATENT DOCUMENTS

| | | | |
|---|---|---|---|
| 2,828,668 A | * | 4/1958 | Angelis ....................... 351/153 |
| 4,345,848 A | * | 8/1982 | Cheselka ..................... 16/228 |
| 5,224,248 A | * | 7/1993 | Brilliant ...................... 16/228 |
| 5,367,344 A | | 11/1994 | Fuchs |
| 6,007,200 A | | 12/1999 | Tachibana |
| 6,024,445 A | | 2/2000 | Conner et al. |
| 6,170,950 B1 | * | 1/2001 | Yoshida ....................... 351/110 |
| 6,199,981 B1 | | 3/2001 | Chao |
| 6,210,002 B1 | | 4/2001 | Tachibana |
| 6,409,337 B1 | * | 6/2002 | Delamour et al. .......... 351/146 |

* cited by examiner

*Primary Examiner*—Huy Mai
(74) *Attorney, Agent, or Firm*—Rob L. Phillips; Quirk & Tratos

(57) ABSTRACT

Fastening means for attaching eyeglass members together includes a barbed locking pin inserted into a bushing. More particularly, rimless eyeglasses require new technology to render them long-lasting and fail-safe. Said unique means of attachment is a highly effective replacement for the typical screw attachment means in many eyeglass configurations, including rimless and rimmed versions. In one embodiment, the barbed pin is inserted into the bushing such that the barbs restrict removal. The barbs can be spaced circumferentially along a length of the pin or can be intermittently distributed along the pin. In another embodiment, co-planer barbs along the pin create additional sharp corners to facilitate a connection between the pin and bushing. In a preferred embodiment the barbs are metal. The invention disclosed facilitates fail-safe attachment of eyeglass members together including a temple hinge mounting-bracket to a temple or lens and a bridge member to a pair of lenses.

48 Claims, 7 Drawing Sheets

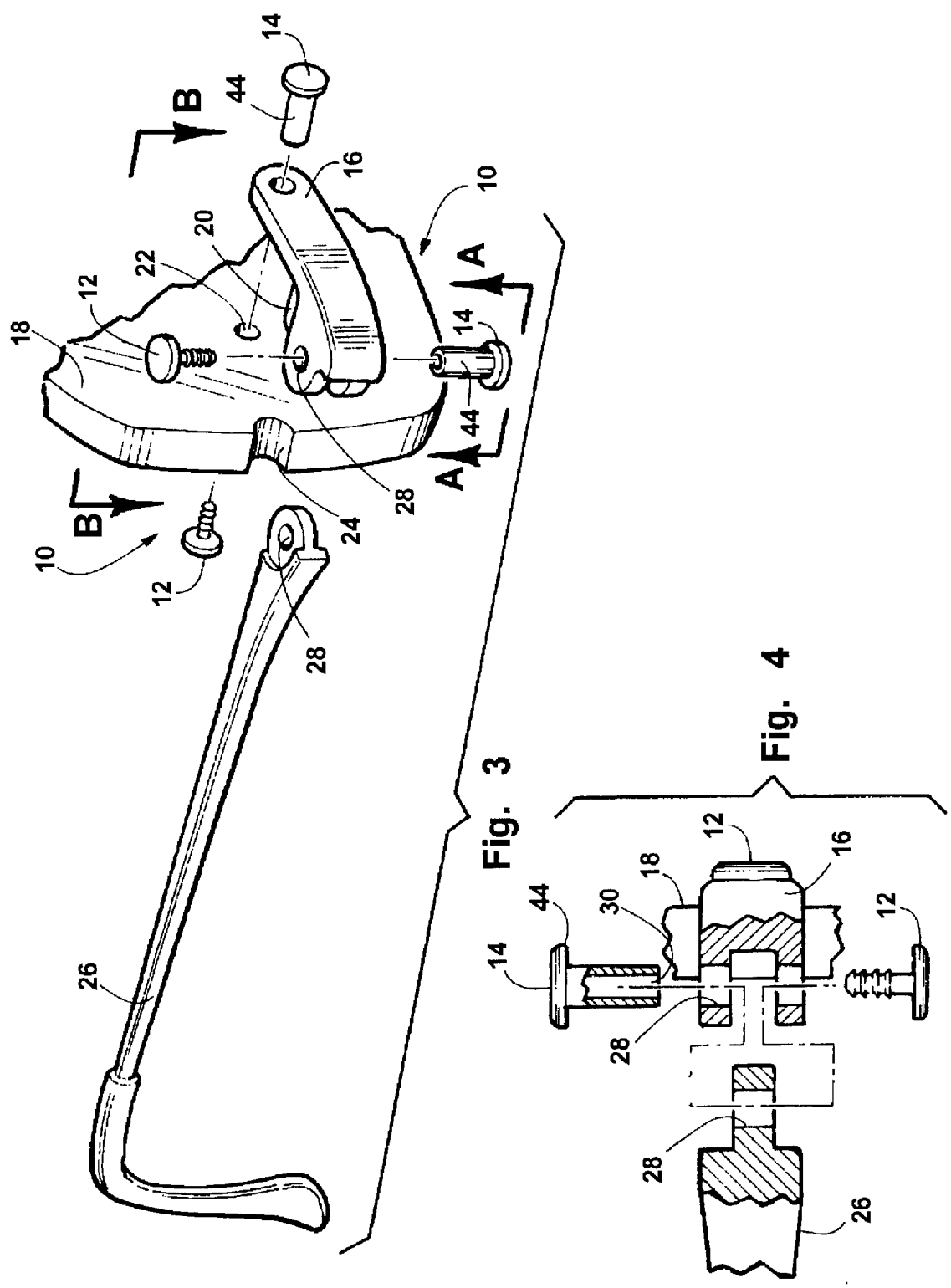

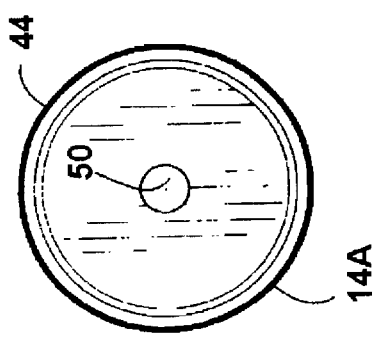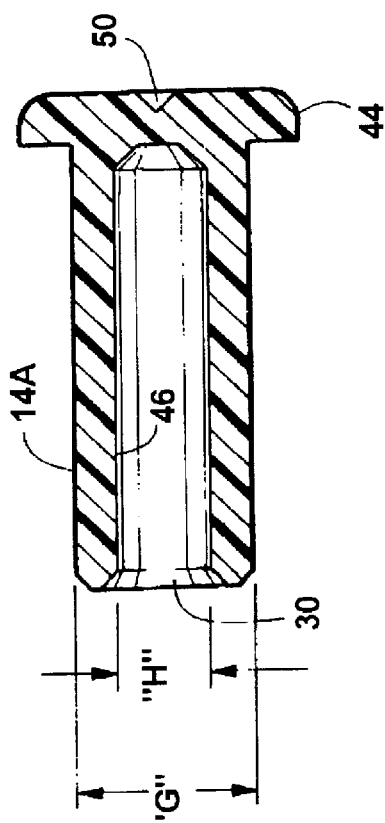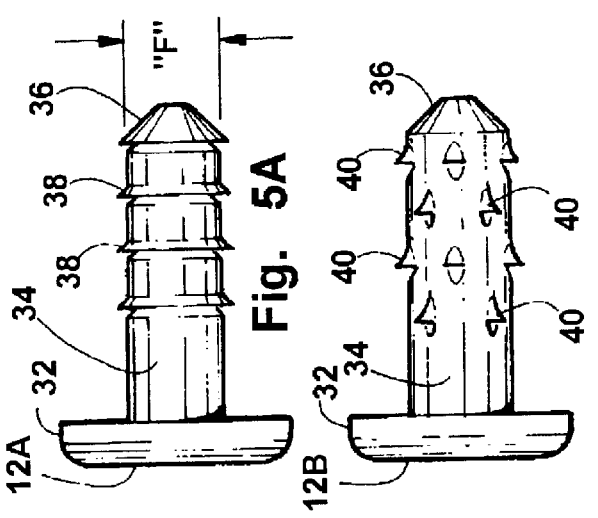

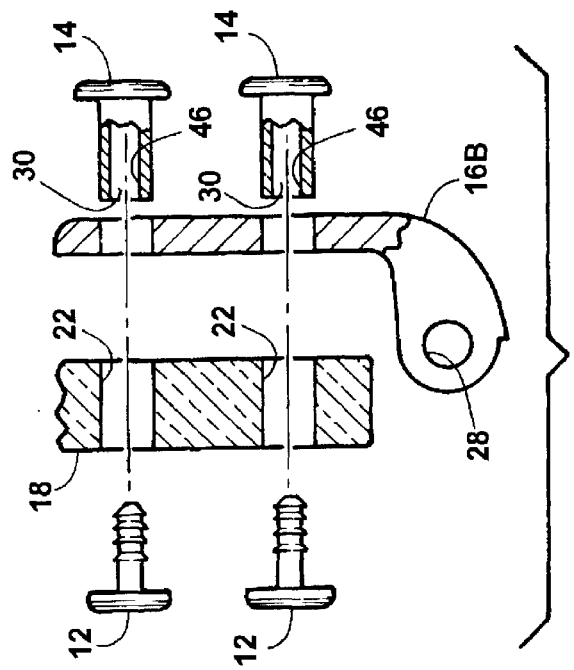
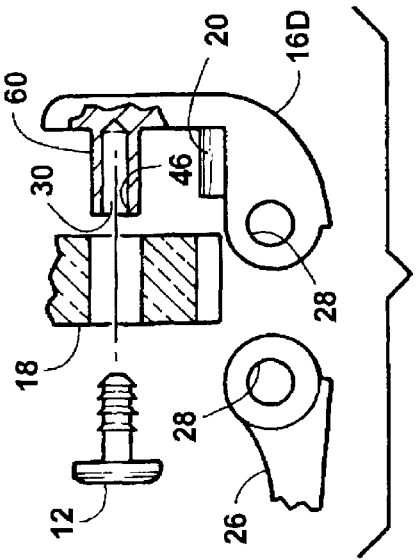
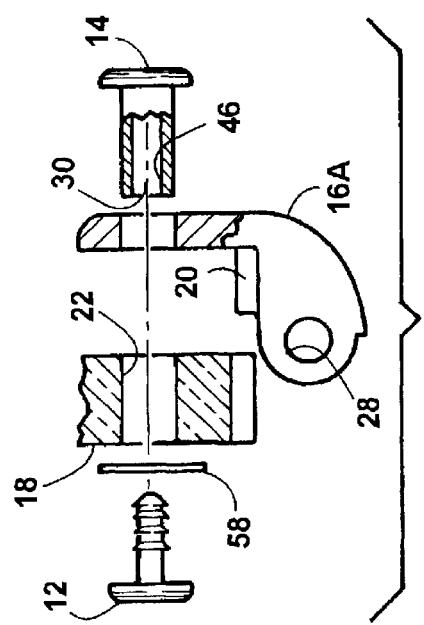
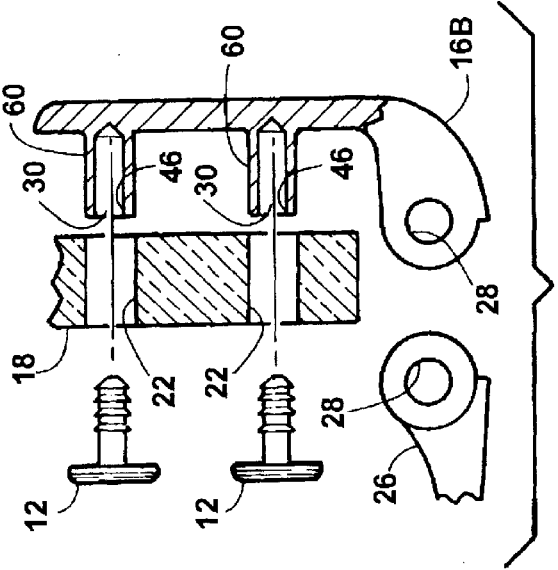

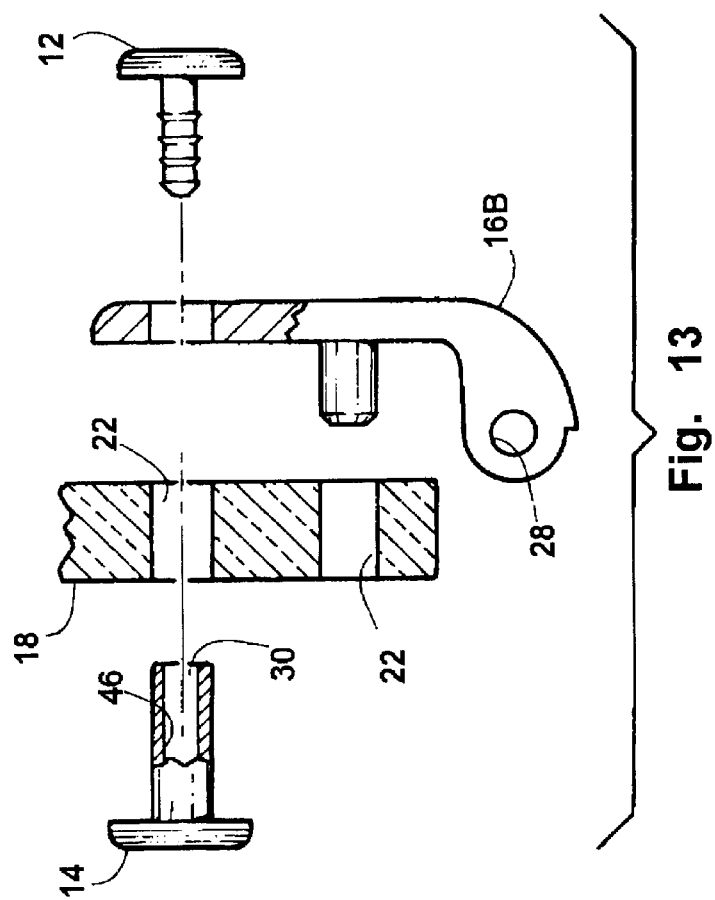
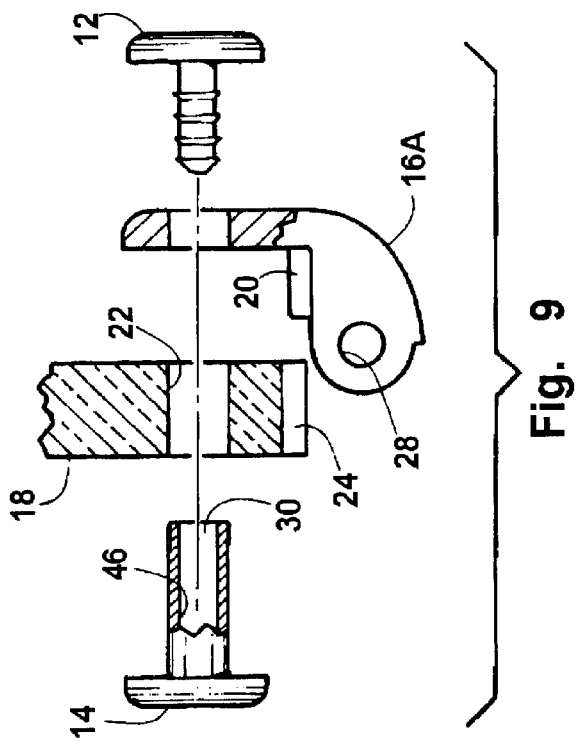

MULTIPURPOSE LOCKING AND FASTENING DEVICE

FIELD OF THE INVENTION

This invention relates to a means to replace the screws used on an assembly of eyeglasses, including the attachment means for connecting and pivoting of a temple to a temple hinge-mounting bracket (also known as "temple end pieces"), offering a friction free rotation at the hinge point of the temple and the temple hinge-mounting bracket. This device consists of a barbed locking pin inserted into either a plastic bushing or a bushing-like section of a plastic temple hinge-mounting bracket. The combination of the barbed locking pin and the plastic locking bushing makes an effective attachment means for mounting the temple hinge mounting bracket and a bridge section to rimless glasses without the use of screws. In a preferred embodiment the pins and barbs are fabricated of metal. However, other materials may be used to accomplish the same result.

BACKGROUND OF THE INVENTION

A common problem occurring with eyeglasses, including sun glasses, is that after a period of time the screws used to manufacture said eyeglasses, including attachment with screws of the temples to the temple hinge mounting-bracket, temple hinge mounting-bracket to the lenses and bridge members to the lenses, loosen, fall out and become lost making the glasses unusable. Additionally, screws used on other locations of eyeglasses loosen and fall out as a result of the flexing of the frame during normal use. Compounding the problem, persons wearing the eyeglasses typically require use of the eyeglasses to locate the screw and replace it. Rimless glasses offer a particular problem where the attachment means requires drilling of a hole in the lens while applying no outward forces on the hole that might crack the lens. In some cases where persons attempt to tighten the screws themselves, they tighten the screws too tight, resulting in a cracked lens. The use of permanent attachments results in eyeglass damage, during attempted disassembly, that cannot be repaired by the owner. Thus the eyeglasses must be taken to a facility for repair.

This invention describes a new and unique locking and fastening means for replacing the screws used on eyeglasses with a barbed locking pin and a plastic bushing. More particularly, this invention discloses a method whereby the locking pin can additionally be used to lock plastic parts that have bushing-like protrusions thereon into various positions in the assembly of the eyeglasses. This invention solves the long-standing problem and provides a method of hinging and attaching eyeglass parts in a simple and unique fashion. Reference to other patents:

U.S. Pat. No. 6,024,445 (the '445 Patent) of Conner et al. describes a means of attachment of a bridge and temple to the lens of rimless glasses. The attachment is accomplished by providing a tapered aperture in each lens adjacent to the outer surface of the lens and conforming to the distal ends of the bridge and temple hinge to conform to the taper of the aperture. An alternate embodiment uses a plastic bushing with an internal matching taper that inserts through a straight hole in the glass lens. Although the use of a bushing is common with the '445 Patent, it does not disclose use of a barbed locking pin attachment and does not have the capability to use the same or similar device for the replacement of the screw in the hinge attachment of the eyeglass temple and the temple mounting bracket.

U.S. Pat. No. 6,199,981 B1 (the '981 Patent) of Chao describes a method for solidly securing the spectacle members, including the lenses and temples and/or bridge, to one another without fasteners. The '981 patent describes a method of attachment by means of inserting a portion of the frame member, or bridge member, through an orifice in the lens which is melted or deformed with a welding device for permanent attachment. With this form of attachment the frames and bridge members to lenses are permanent. Also, the hinge for the temple and temple mounting bracket requires use of a conventional screw for the hinge attachment. Thus the '981 Patent lacks obvious similarities to the invention disclosed herein.

U.S. Pat. No. 6,210,002 B1 (the '002 Patent) of Tachibana describes a lens holding mechanism for spectacles. The '002 Patent uses a hinged temple mount and bridge mount translating through an orifice in the lens with two inserting pins aligned in parallel with circumferential projections of barbs, which lock within orifices in an elastically deformable holding member. The protruding tubular member inserts into the orifice in the eyeglass lens and works effectively. This produces a permanent attachment that cannot be removed without breaking major pieces of the spectacles. Although the '002 Patent discloses a circumferential rib on the attaching member, it would not work effectively as a multipurpose hinge pin and attachment means that can be easily removed and replaced with a new locking pin and plastic bushing.

U.S. Pat. No. 5,367,344 (the '344 Patent) of Fusch describes eyeglasses using a lens holding means that is comprised of pairs of U-shaped retaining pins extending in respective bores of the lenses and are affixed to a lens holding portion of a hingeless eyeglass frame. Because the two retaining pins are connected to form a U-shaped wire, the deformability of the U-shaped wire permits an effective compensation of any deviation of the distance between the holes in the lens from the spacing of the retaining pins. The retaining pins are held in bores through the lenses by plug-like plastic bushings in the bores. The '344 Patent describes a style of eyeglasses with a central mounting system not including a hinged temple mount or separate bridge mount. It would be difficult to use the U-shaped attachment means for mounting separate bridge and temple hinge mounts due to the spacing of the deformable wire pins.

Thus, there is a continuing need in the optical field for a simple and economical means to replace the screws used for the assembly.

SUMMARY OF THE INVENTION

The preferred embodiment of the present invention is accomplished by providing a unique locking and fastening device comprised of a barbed locking pin with a plurality of circumferential radial barbs or projections along a shank portion beginning at a distal end with an enlarged head at an opposite end. The circumferential barbs may be, but are not limited to, material of the shank portion that has been gouged circumferentially lifting metal portions above the shank surface or machined to form a circumferential barb angled so as to restrict removal. The distal end of the shank portion has a conical chamfer to facilitate easy insertion into a bushing.

An alternate embodiment of the barbed locking pin has a plurality of singular locking barbs in the form of radial ribs located circumferentially and laterally along the shank section starting at the distal end. These singular locking barbs can be formed by gouging the shank section at spaced intervals lifting a sharp point above the shank surface in a direction to restrict removal from a plastic bushing. This type of barb cuts into the plastic bushing more effectively and exerts less outward force on the bushing and eyeglass lens. Alternatively, if the pin is made from a non-metallic material, such as a rigid plastic, the pin can be molded by conventional means.

Another alternate embodiment of the locking pin includes formed barbs similar in shape to the preferred circumferential barbs but said circumferential barbs have portions removed. In other words, several groups of two or more individual barbs are spaced circumferentially in a same plane about the shank of the pin. It is envisioned that certain portions of the preferred circumferential barbs may be machined off the pin shank to create the alternative embodiment.

A plastic bushing with an enlarged head forms the locking portion of the device. The preferred embodiment of the bushing has a chamfer in the bore to facilitate easy insertion of the barbed locking pin. These bushings may be made of many different kinds of polymers, including Teflon®, permitting smooth rotational action of the hinge member. Application of light pressure to the heads of the barbed locking pin and the plastic bushing will lock the two pieces in their desired location. An optional rubber or plastic washer may be placed under the head of the barbed locking pin to rest against the lens on rimless glasses to cushion and resist abrasion of the lens by the head of the locking and fastening pin. If necessary, the head of the plastic bushing can be cut off for removal without damaging the individual parts of the eyeglasses and a new barbed locking pin and plastic locking bushing can easily be replaced.

An additional alternate embodiment of the plastic bushing will have a bushing-like member protruding from a plastic temple hinge-mounting bracket. The protruding bushing member will have a bore with a chamfered end to facilitate easy insertion of the barbed locking pin.

When the locking and fastening device, comprised of the barbed locking pin and the plastic bushing, is used to attach the temple to the temple hinge mounting bracket, a straight bore through the two pieces to be attached is all that is required, rather than the common fine threaded screw and nut. The use of known polymers in the bushing causes a smooth rotation of the hinge preventing loosening accompanied by continuous use.

The object of this invention is to create a simple locking and fastening device to be used in the eyeglass industry.

Another object of this invention is to replace the screws used to attach various elements of eyeglasses.

Another object of this invention is to replace the common screws used on the pivot of the temple and temple-mounting bracket.

Another object of this invention is to reduce the cost and time of manufacturing and assembling eyeglasses.

Another object of this invention is to create a smooth working hinge on eyeglasses that will not loosen or fail after prolonged usage.

Another object of the invention is to create eyeglasses assemblies with a cleaner appearance.

Another object of the invention is to eliminate the possibility individuals will over tighten screws on eyeglasses breaking the lenses.

Still another object of this invention is to produce eyeglasses that do not structurally loosen over time or fail all together.

A final object of this invention is to produce a device that will extend the useable life of all forms of eyeglasses.

These and other objects and advantages which will become subsequently apparent, reside in the details of the construction and operation as more fully hereinafter described and claimed, reference being had to the accompanying drawings forming a part hereof, wherein like numerals refer to like parts throughout.

BRIEF DESCRIPTION OF THE DRAWING FIGURES

The accompanying drawings, which are incorporated in and form a part of this specification, illustrate embodiments of the invention and together with the description, serve to explain the principles of the invention.

FIG. 1 is a fully assembled pair of eyeglasses that may be manufactured using the multipurpose locking and fastening device of the present invention. Many variations of eyeglasses, other than the specific model shown in FIG. 1, will benefit from the present invention. The use of more than one locking and fastening device in other embodiments is explored in the following figures and throughout the specification.

FIG. 3 is an exploded perspective view of the eyeglass temple, temple hinge mounting bracket, the lens and barbed locking pins including the plastic bushings.

FIG. 4 is an exploded side elevation view of the hinge point where the eyeglass temple and the temple hinge-mounting bracket attach showing a common orifice where the barbed locking pin and the plastic bushing interact.

FIG. 5A is a side elevation view of the barbed locking pin with a plurality of circumferential barbs.

FIG. 5B is a side elevation view of an alternate embodiment of the barbed locking pin with a plurality of singular intermittently spaced locking barbs.

FIG. 6 is a cross-section view along direction A (shown in FIG. 3) of the preferred embodiment of the plastic bushing.

FIG. 7 is an end view of the preferred embodiment of the plastic bushing.

FIG. 8 is an exploded cross-section view along direction B (shown in FIG. 3) through the eyeglass lens showing the barbed locking pin, an optional rubber or plastic cushion washer, the temple hinge-mounting bracket with a fixed anti-rotation member and the plastic bushing.

FIG. 9 is a second configuration of the exploded cross-section view of FIG. 8 showing the barbed locking pin and plastic bushing in opposite positions.

FIG. 10 is an exploded cross-section view along direction B (shown in FIG. 3) through the eyeglass lens showing two locking pins and two plastic bushings as a means to eliminate rotation.

FIG. 11 is an exploded cross-section view along direction B (shown in FIG. 3) through the eyeglass lens showing two locking pins and two bushing-like sections incorporated on the temple hinge-mounting bracket.

FIG. 12 is an exploded cross-section view along direction B (shown in FIG. 3) through the eyeglass lens showing the embodiment with the single barbed locking pin and the plastic temple hinge mounting bracket incorporating a bushing-like member with the anti-rotation member.

FIG. 13 is an exploded cross-section view along direction B (shown in FIG. 3) through the eyeglass lens showing a temple hinge mounting-bracket including an anti-rotation pin.

DETAILED DESCRIPTION OF THE PREFERRED EMBODIMENTS

Figure 1:
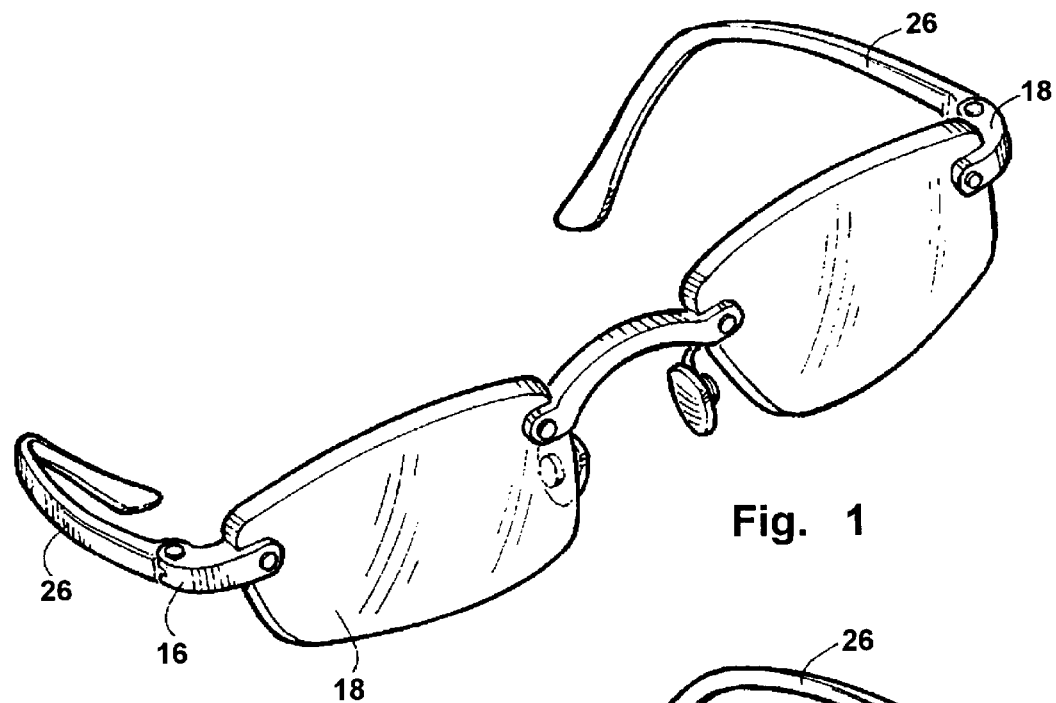
Figure 2:
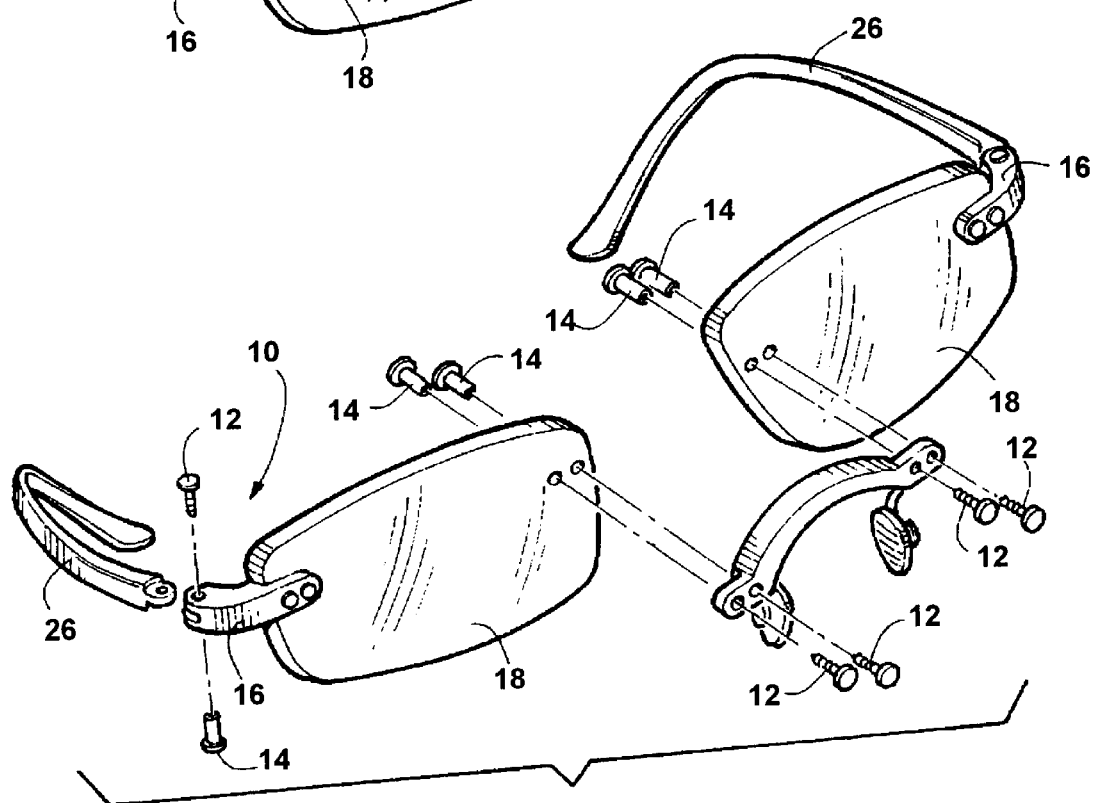
FIG. 2 is a semi-exploded view of the pair of eyeglasses of FIG. 1 illustrating the use of the multipurpose locking and fastening device of the present invention to attach the bridge to the lenses and the temples to the temple hinge mounting-brackets.

Referring in detail now to the drawings, similar parts of the invention are used in several applications but perform the same function and are intended to be covered within the scope of this patent. Similar parts of this invention are identified by like reference numerals. FIGS. 1 and 2 illustrate a general eyeglass design that may benefit from the present invention. More particularly, referring to FIG. 3, the assembly of the preferred embodiment of a locking and fastening device 10 comprises a barbed locking pin 12 and a mating bushing 14. The preferred embodiment of the invention disclosed and claimed herein has at least two applications. A first application is a means of attachment of a temple hinge-mounting bracket 16 to one side of an eyeglass lens 18. A single locking and fastening device 10 is shown used on a temple hinge-mounting bracket 16 with an anti-rotation member 20 incorporated on the bracket 16. A mounting orifice 22 drilled through the lens 18 has a diameter that allows a tight slip fit for the plastic bushing 14 and a slot 24 cut in a side of the lens 18 that allows the anti-rotation member 20 to lock therein. It should be understood that this means of attachment is for both lenses and temple hinge-mounting brackets 16 of a pair of eyeglasses. The means of attachment may also be used in the same fashion for mounting a bridge or other structure on rimless eyeglasses.

Additionally, shown in FIG. 3 is the locking and fastening device 10 used to attach the temple hinge-mounting bracket 16 to the temple member 26 through a common smooth bore orifice 28. Although a variety of different plastics may be used in the manufacturing process of the plastic bushing 14, known polymers produce the least resistance during the rotation involved opening and closing the eyeglasses. FIG. 4 provides greater detail of the mounting of the temple hinge-mounting bracket 16 to the temple member 26 by illustrating the insertion of the plastic bushing 14 through the smooth bore orifice 28 when the two pieces are attached. The barbed locking pin 12 is inserted into the orifice 30 in the plastic bushing 14 and pressed into a full locking engagement. It must be noted that the locking and fastening device 10 can be inserted into the smooth bore orifice 28 from either direction. The term "bore" is used to describe a channel or opening in the bushing and is not to be considered as a term limited by method of fabrication.

FIG. 5A is a side elevation view of the preferred embodiment of the barbed locking pin 12A comprised of a enlarged head end 32 with a shank section 34 of varying lengths to be determined by the locking and fastening device 10 as used in various applications. The distal end 36 is tapered for easy insertion into the orifice 30 in the plastic bushing 14.

Starting at the distal end 36 of the shank section 34 there are a plurality of circumferential barbs 38 that may be made by a gouging operation where the pin material is formed in the direction of the distal end 36 creating the barbs 38 to be lifted above the surface of the shank 34. The barbs 38 may also be manufactured in a turning operation on an automatic screw machine. The shank section 34 will have a diameter "F" with a close enough tolerance to produce a slight interference fit when inserted into orifice 30 of the plastic bushing so that the barbs 38 cut into the bore 46 of the plastic bushing 14 when there is any separation force applied to the two pieces.

An alternate embodiment, shown as a side elevation in FIG. 5B, of the barbed locking pin 12B has the same enlarged head end 32 with a taper on the distal end 36 but includes a plurality of circumferential and lateral singular locking barbs 40 extending above the surface of the shank section 34. The singular barbs 40 are manufactured by a gouging operation where a single sharp point of metal is lifted above the surface of the shank section 34 similar to the teeth on a common wood rasp. This type of barb exerts less outward force on the plastic bushing 14 at the points the sharp pointed barbs 40 cut into the plastic and with less stress on the sides of the orifice 22 in lens 18 while performing the same locking function. Applying undue stress on the mountings of rimless glasses is a common cause of cracks in the lenses 18 at the mounting points.

Figure 5C:
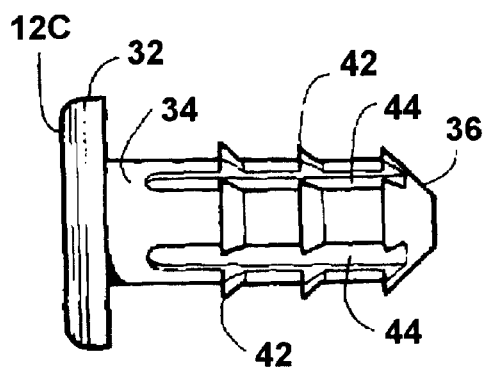
FIG. 5C is a side elevation view of a third embodiment of the locking pin with portions of the circumferential barbs illustrated in FIG. 5A removed.
Figure 5D:
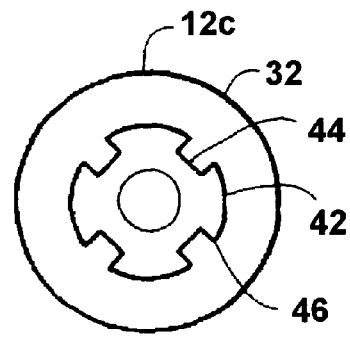
FIG. 5D illustrates an end view of the barbed locking pin showing more clearly the position, shape and depth of the circumferential barbs and grooves.

A second alternate embodiment, shown as a side elevation in FIG. 5C, of the barbed locking pin 12C has the same enlarged head end 32 with a taper on the distal end 36 but includes a plurality of barbs extending above the surface of the shank section 34 to perform the locking function. In comparison to the preferred embodiment illustrated in FIG. 5A it is observed that the barbs 42 of FIG. 5C are similar with the noted difference that portions of the circumferential barbs 38 of FIG. 5A are removed forming grooves 44 thereon to provide more individual sharp corners 46 to gouge the plastic bushing 14 and to reduce the side forces encountered with the circumferential grooves 38 of the embodiment illustrated in FIG. 5A. FIG. 5D illustrates an end view of the barbed locking pin 12C showing more clearly the position, shape and depth of the circumferential barbs 42 and grooves 44.

FIG. 6 shows the preferred embodiment of the plastic bushing 14 in a section view along direction 1 of FIG. 3 with a lip 44 at one end and an orifice 30 to a central bore 46 at the distal end 48. Diameter "H" of bore 46 establishes a slight interference fit with diameter "F" of the barbed locking pin 12 producing a positive locking means when the two pieces are joined. Diameter "G" of the plastic bushing 14 establishes a tight slip fit when inserted through mounting orifice 22 in eyeglass lens 18. A conical centering point 50 shown in FIG. 7 is located at the center of the lip 44 to establish a center point should the plastic bushing 14 require removal by means of drilling.

FIG. 8 is an exploded section view through the eyeglass lens 18 showing the barbed locking pin 12 with an optional plastic or rubber cushion washer 58 used to relieve stress or abrasion on the lens 18 and placed between the locking pin 12 and the lens 18. The single locking and fastening device 10 is used in connection with the temple hinge-mounting bracket 16A having an anti-rotation member 20 that locks into slot 24 upon assembly. FIG. 9 shows the identical temple hinge mounting-bracket 16A, barbed locking pin 12 and bushing 14 of FIG. 8, but in a second configuration. The barbed locking pin 12 is inserted first through an aperture in the temple hinge mounting-bracket 16A and continues into the central bore 46 of the bushing 14 that is inserted into the lens orifice 22 from a direction opposite the insertion of the barbed locking pin 12. This second configuration removes the necessity of the cushion washer 58. FIG. 10 illustrates an exploded section with two locking and fastening devices 10 used to attach the temple hinge mounting bracket 16B to lens 18 eliminating rotation upon assembly.

FIG. 11 illustrates two barbed locking pins 12 aligned through two orifices 22 in lens 18 that lock into a central bore 46 of bushing-like members 60 in a plastic temple hinge mounting bracket 16C. FIG. 12 illustrates a single barbed locking pin 12 aligned through orifice 22 in lens 18 and anti-rotation member 20 used for mounting. FIG. 13 illustrates a temple hinge mounting-bracket 16B including an anti-rotation pin 62 for insertion into a first lens orifice 22. The barbed locking pin 12 is inserted first through an aperture in the temple hinge mounting-bracket 16B and continues into the central bore 46 of the bushing 14 that is inserted into the lens orifice 22 from a direction opposite the insertion of the barbed locking pin 12.

Figure 14:
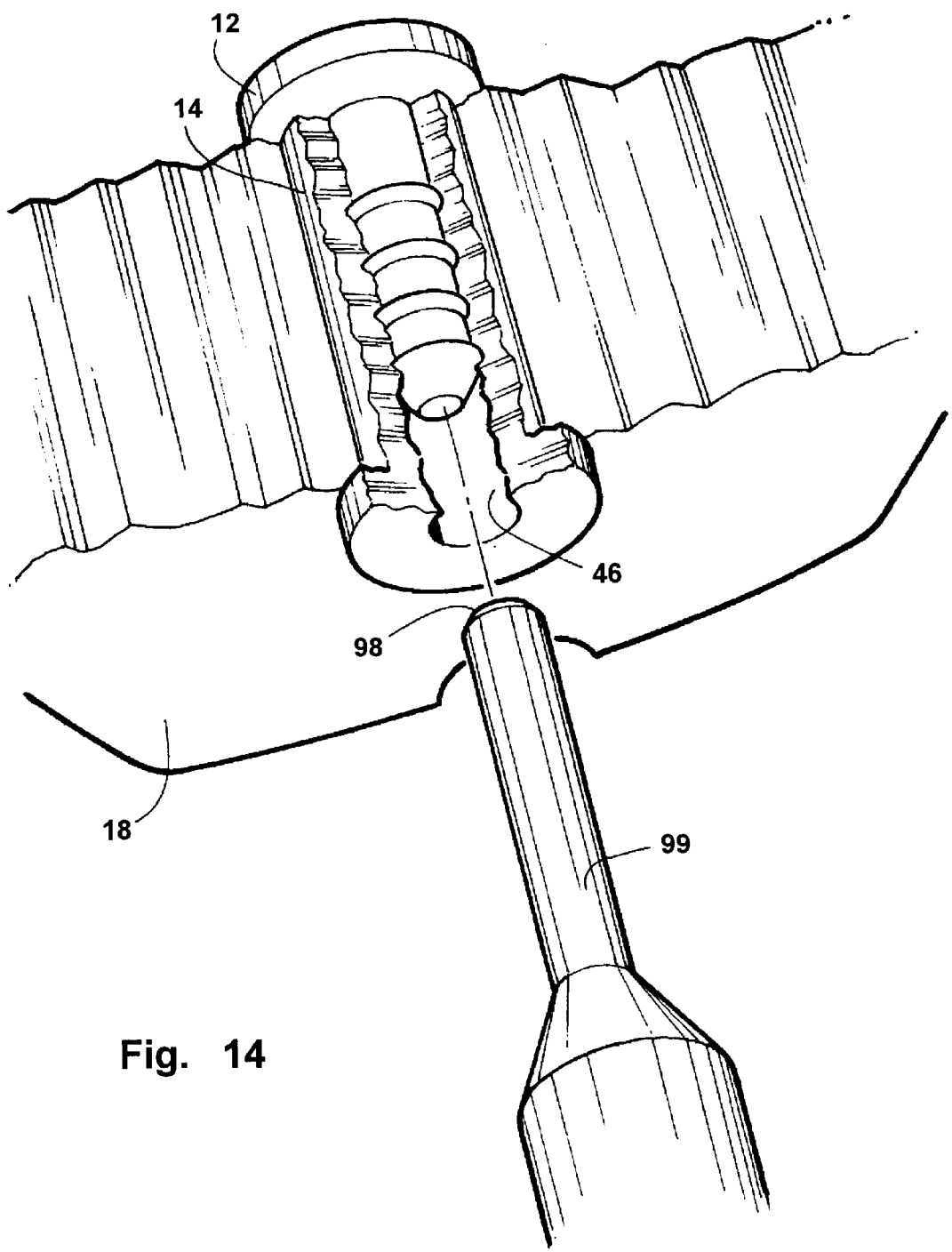
FIG. 14 is a cut-away view of a bushing, including a bore completely therethrough, with a pin inserted into said bore and a tool used to remove said pin from said bushing.

In a preferred embodiment, the bushings 14 heretofore illustrated in the figures have shown a blind bore 46. Now referring to FIG. 14, in another embodiment, the bushing 14 includes a bore 46 completely through said bushing 14. The inclusion of a bore 46 completely through said bushing 14 facilitates the removal of the barbed locking pin 12 by allowing insertion of the tip 98 of a small tool 99 through said bore 46 of bushing 14 in a direction opposite insertion of the barbed locking pins 12. The tool 99 is used to force the barbed locking pins 12 from confinement within bores 46 of the bushings 14. This procedure allows, in some cases, said bushing 14 to be re-used, or at a minimum, prevents damage to the eyeglass lenses where use of a razor blade to shave off a lip 44 of the bushing 14 is customarily done.

Although the barbed locking pins 12 and bushings 14 have been demonstrated to insert through a certain orifice in a certain eyeglass member, it is noted that the barbed locking pins 12 and bushings 14 are interchangeable so that each may be inserted through orifices in said eyeglass members through either direction. Further, machining has been described as the method of manufacturing the barbed locking pins but other methods including molds are possible.

While the present invention has been described herein with reference to particular embodiments thereof, a latitude of modification, various changes and substitutions are intended in the foregoing disclosure, and it will be appreciated that in some instances some features of the invention will be employed without a corresponding use of the other features without departing from the scope of the invention as set forth.

For example, while the locking pins described herein have been described as being fabricated from metal, they can be made from other rigid, or at least semi-rigid, material such as plastic. The pins must be sufficiently rigid, and have sufficient strength, such that the pins compress the interior of the bushing and the barbs or projections can engage the interior of the bushing, without damaging the body of the pin. As long as the pins meet the functional criteria of the invention, the material and method of manufacture of the pins is not part of the invention. Metal pins are preferred because of the ease of conventional fabrication, though rigid plastic components are easily molded. Stainless steel or chrome-plated pins may be desirable for appearance.

The bushings are generally made from a deformable or irrepressible plastic or rubber which has sufficient strength to hold the pin in place, but allows at least some penetration of the barbs in order to establish a firm fastening of the two components. It is undesirable to form said bushings of overly soft material as said pins will tend to rip through the material causing the fastening device to fail. For example, polycarbonate and nylon are desirable materials for fabricating said bushings. It is also preferable that the bushing material be resistant to chemicals used to clean eyeglasses. Exposure to cleaning chemicals can weaken and deteriorate certain fastening materials, once again, causing failure.

The term "barb" as used herein is used to describe any radial rib, protrusion or projection which can engage and mate with the inner portion of the bushing. The invention should not be limited with respect to the number, type or shape of the barbs.

While the interior of the bushing has been shown in its preferred embodiment as a smooth, generally cylindrical surface, it can be slightly tapered or irregular, or can have a different cross-section shape, as long as it mates properly and engages firmly with the pin to preclude accidental decoupling of the fastening elements.

I claim:

1. A fastening device for attaching together a first eyeglass member having a first opening therein and a second eyeglass member having a second opening therein comprising:
    a bushing for insertion through said first opening and at least partially into said second opening, said bushing including an interior channel open to an end portion of the bushing; and
    a pin for insertion through the second opening and into the interior channel of the bushing, said pin having a head and shank portion having a plurality of barbs extending radially therefrom for engaging channel walls to prevent undesired removal of the pin from the bushing.

2. The fastening device of claim 1 wherein said bushing further includes a peripheral lip spaced from the channel opening.

3. The fastening device of claim 2 wherein the lip of the pin includes a conical center point to facilitate removal.

4. The fastening device of claim 1 wherein said pin and barbs are fabricated of a metallic material.

5. The fastening device of claim 1 wherein the bushing is fabricated of a polymer.

6. The fastening device of claim 1 wherein the bushing is fabricated of nylon.

7. The fastening device of claim 1 wherein the first eyeglass member is a lens and the second eyeglass member is a temple hinge mounting-bracket or bridge.

8. The fastening device of claim 1 wherein the first eyeglass member is a bridge and the second eyeglass member is a lens.

9. The fastening device of claim 1 wherein the first eyeglass member is a temple hinge mounting-bracket and the second eyeglass member is a temple or lens.

10. The fastening device of claim 9 wherein the second eyeglass member is a temple including a circular projection with a circular aperture on one end;
    said temple hinge mounting-bracket including a first projection near an upper surface and a second projection near a lower surface defining a recess therebetween;
    said first and second projections including circular apertures;
    said temple circular projection interposes within said recess permitting the bushing to be inserted at least partially through a passage defined by the aligned first and second projection apertures of the temple hinge mounting-bracket and the aperture of the temple projection; and said pin being inserted into the passage and bushing channel.

11. The fastening device of claim 1 wherein the barbs are circumferential and spaced along the length of said shank and are angled to facilitate insertion into the channel and prevent removal upon insertion.

12. The fastening device of claim 1 wherein the barbs are sharply pointed, said barbs being located intermittently along the length of the shank and directed to facilitate insertion into the channel and prevent removal upon insertion.

13. The fastening device of claim 1 wherein said pin includes a plurality of co-planer spaced barbs.

14. The fastening device of claim 1 wherein the shank further includes a conical tip spaced from the head.

15. The fastening device of claim 1 wherein a washer is positioned between said pin head and the surface of the second eyeglass member.

16. A fastening device for attaching together a first eyeglass member and a second eyeglass member having an opening therein comprising:
   said first eyeglass member including a stem extending therefrom for insertion into said opening, said stem including an interior channel open to an end portion of the stem; and
   a pin for insertion through the opening and into the interior channel of the stem, said pin having a head and shank portion having a plurality of barbs extending radially therefrom for engaging channel walls to prevent undesired removal of the pin from the stem.

17. The fastening device of claim 16 wherein said first eyeglass member includes a plurality of stems and said second eyeglass member includes a plurality of openings whereby said stems insert into said openings; and
   a plurality of pins for insertion through the openings and into the interior channels of said stems.

18. The fastening device of claim 16 wherein said pin and barbs are fabricated of a metallic material.

19. The fastening device of claim 16 wherein the stem is fabricated of a polymer.

20. The fastening device of claim 16 wherein the stem is fabricated of nylon.

21. The fastening device of claim 16 wherein the first eyeglass member is a temple hinge mounting-bracket.

22. The fastening device of claim 16 wherein the first eyeglass member is a bridge.

23. A fastening device for attaching together a first eyeglass member having a first opening therein and a second eyeglass member having a having a second opening therein comprising:
   a bushing for insertion through said first opening and at least partially into said second opening, said bushing including an interior channel therethrough; and
   a pin for insertion through the second opening and into the interior channel of the bushing, said pin having a head and shank portion having a plurality of barbs extending radially therefrom for engaging channel walls to prevent undesired removal of the pin from the bushing.

24. The fastening device of claim 23 wherein said bushing further includes a peripheral lip on one end thereof.

25. The fastening device of claim 23 wherein said channel through said bushing facilitates disassembly of said first eyeglass member and said second eyeglass member by insertion of a small tool into said channel opposite the insertion of said pin whereby a tool tip applies pressure to an end portion of the shank of the pin causing said pin to be forced from within said bushing channel.

26. In combination, a first eyeglass member having a first opening therein and a second eyeglass member having a second opening therein, and fastening means attaching said first eyeglass member to said second eyeglass member comprising:
   a bushing mounted in said first opening and at least partially into said second opening, said bushing including an interior channel open to an end portion of the bushing; and
   a pin extending through the second opening and into the interior channel of the bushing, said pin having a head and shank portion having a plurality of barbs extending radially therefrom, said barbs engaging channel walls to prevent undesired removal of the pin from the bushing.

27. The fastening device of claim 26 wherein said bushing further includes a peripheral lip spaced from the channel opening.

28. The combination of claim 26 wherein said pin and barbs are fabricated of a metallic material.

29. The combination of claim 26 wherein the stem is fabricated of a polymer.

30. The combination of claim 26 wherein the stem is fabricated of nylon.

31. The combination of claim 26 wherein the first eyeglass member is a lens and the second eyeglass member is a temple hinge mounting-bracket or bridge.

32. The combination of claim 26 wherein the first eyeglass member is a bridge and the second eyeglass member is a lens.

33. The combination of claim 26 wherein the first eyeglass member is a temple hinge mounting-bracket and the second eyeglass member is a temple or lens.

34. A pair of eyeglasses having first and second members, said first member having a first opening therein and said second member having a second opening therein, and fastening means for attaching the first and second members together comprising:
   a bushing for insertion through said first opening and at least partially into said second opening, said bushing including an interior channel open to an end portion of the bushing; and
   a pin for insertion through the second opening and into the interior channel of the bushing, said pin having a head and shank portion having a plurality of barbs extending radially therefrom for engaging channel walls to prevent undesired removal of the pin from the bushing.

35. The fastening device of claim 34 wherein said bushing further includes a peripheral lip spaced from the channel opening.

36. The fastening device of claim 35 wherein the lip of the pin includes a conical center point to facilitate removal.

37. The fastening device of claim 34 wherein said pin and barbs are fabricated of a metallic material.

38. The fastening device of claim 34 wherein the bushing is fabricated of a polymer.

39. The fastening device of claim 34 wherein the bushing is fabricated of nylon.

40. The fastening device of claim 34 wherein the first eyeglass member is a lens and the second eyeglass member is a temple hinge mounting-bracket or bridge.

41. The fastening device of claim 34 wherein the first eyeglass member is a bridge and the second eyeglass member is a temple lens.

42. The fastening device of claim 34 wherein the first eyeglass member is a temple hinge mounting-bracket and the second eyeglass member is a temple or lens.

43. The fastening device of claim 42 wherein the second eyeglass member is a temple including a circular projection with a circular aperture on one end;

said temple hinge mounting-bracket including a first projection near an upper surface and a second projection near a lower surface defining a recess therebetween;

said first and second projections including circular apertures;

said temple circular projection interposes within said recess permitting the bushing to be inserted at least partially through a passage defined by the aligned first and second projection apertures of the temple hinge mounting-bracket and the aperture of the temple projection; and said pin being inserted into the passage and bushing channel.

44. The fastening device of claim 34 wherein the barbs are circumferential and spaced along the length of said shank and are angled to facilitate insertion into the channel and prevent removal upon insertion.

45. The fastening device of claim 34 wherein the barbs are sharply pointed, said barbs being located intermittently along the length of the shank and directed to facilitate insertion into the channel and prevent removal upon insertion.

46. The fastening device of claim 34 wherein said pin includes a plurality of co-planer spaced barbs.

47. The fastening device of claim 34 wherein the shank further includes a conical tip spaced from the head.

48. The fastening device of claim 34 wherein a washer is positioned between said pin head and the surface of the second eyeglass member.

* * * * *

UNITED STATES PATENT AND TRADEMARK OFFICE
CERTIFICATE OF CORRECTION

PATENT NO. : 6,682,192 B2
DATED : January 27, 2004
INVENTOR(S) : William A. Conner It is certified that error appears in the above-identified patent and that said Letters Patent is hereby corrected as shown below:

Column 8, line 21 to Column 12, line 16,
Delete claims 1-48 and insert therefor claims 1-47 as follows:

-- 1. A fastening device for attaching together a first eyeglass member having a first opening therein and a second eyeglass member having a second opening therein comprising:
 a bushing for insertion through said first opening and at least partially into said second opening, said bushing including an interior channel open to an end portion of the bushing;
 a pin for insertion through the second opening and into the interior channel of the bushing, said pin having a head and shank said shank having a plurality of barbs extending radially therefrom for engaging the channel walls wherein the plurality of barbs are laterally separated by longitudinal notches along the length of said shank and are angled to facilitate insertion into the channel and to prevent undesired removal of the pin from the bushing.
2. The fastening device of claim 1 wherein said bushing further includes peripheral lip spaced from the channel opening.
3. The fastening device of claim 1 wherein said pin and barbs are fabricated of a metallic material.
4. The fastening device of claim 1 wherein the bushing is fabricated of a polymer.
5. The fastening device of claim 1 wherein the bushing is fabricated of nylon.
6. The fastening device of claim 1 wherein the first eyeglass member is a lens and the second eyeglass member is a temple hinge mounting-bracket or bridge.
7. The fastening device of claim 1 wherein the first eyeglass member is a bridge and the second eyeglass member is a lens.
8. The fastening device of claim 1 wherein the first eyeglass member is a temple hinge mounting-bracket and the second eyeglass member is a temple or lens.
9. The fastening device of claim 1 wherein the shank further includes a conical tip spaced from the head.
10. The fastening device of claim 2 wherein the lip of the bushing includes a conical center point to facilitate removal.

11. The fastening device of claim 8 wherein the second eyeglass member is a temple including a circular projection with a circular aperture on one end;
 said temple hinge mounting-bracket including a first projection near an upper surface and a second projection near a lower surface defining a recess therebetween;
 said first and second projections including circular apertures such that said temple circular projection interposes within said recess permitting the bushing to be inserted at least partially through a first end of a passage defined by the aligned first and second projection apertures of the temple hinge mounting-bracket and the aperture of the temple projection; and
 said pin being insertable into a second end of the passage and into the bushing channel.
12. The fastening device of claim 1 wherein a washer is positioned between said pin head and the surface of the second eyeglass member.
13. A fastening device for attaching together a first eyeglass member and a second eyeglass member having an opening therein comprising:
 said first eyeglass member including a stem extending therefrom for insertion into said opening, said stem including an interior channel open to an end portion of the stem; and
 a pin for insertion through the opening and into the interior channel of the stem, said pin having a head and shank, said shank having a plurality of barbs extending radially therefrom for engaging the channel walls wherein the plurality of barbs are laterally separated by longitudinal notches along the length of said shank and are angled to facilitate insertion into the channel and to prevent undesired removal of the pin from the stem.
14. The fastening device of claim 13 wherein said first eyeglass member includes a plurality of stems and said second eyeglass member includes a plurality of openings whereby said stems insert into said openings; and
 a plurality of pins for insertion through the openings and into the interior channels of said stems.
15. The fastening device of claim 13 wherein said pin and barbs are fabricated of a metallic material.
16. The fastening device of claim 13 wherein the stem is fabricated of a polymer.
17. The fastening device of claim 13 wherein the stem is fabricated of nylon.

UNITED STATES PATENT AND TRADEMARK OFFICE
CERTIFICATE OF CORRECTION

PATENT NO. : 6,682,192 B2
DATED : January 27, 2004
INVENTOR(S) : William A. Conner It is certified that error appears in the above-identified patent and that said Letters Patent is hereby corrected as shown below:

Column 8, line 21 to Column 12, line 16,

18. The fastening device of claim 13 wherein the first eyeglass member is a temple hinge mounting-bracket.
19. The fastening device of claim 13 wherein the first eyeglass member is a bridge.
20. A fastening device for attaching together a first eyeglass member having a first opening therein and a second eyeglass member having a having a second opening therein comprising:
 a bushing for insertion through said first opening and at least partially into said second opening, said bushing including an interior channel therethrough; and
 a pin for insertion through the second opening and into the interior channel of the bushing, said pin having a head and shank, said shank having a plurality of barbs extending radially therefrom for engaging the channel walls wherein the plurality of barbs are laterally separated by longitudinal notches along the length of said shank and are angled to facilitate insertion into the channel and to prevent undesired removal of the pin from the bushing.
21. The fastening device of claim 20 wherein said bushing further includes a peripheral lip on one end thereof.
22. The fastening device of claim 20 wherein said channel through said bushing facilitates disassembly of said first eyeglass member and said second eyeglass member by insertion of a small tool into said channel opposite the insertion of said pin whereby a tool tip applies pressure to an end portion of the shank of the pin causing said pin to be forced from within said bushing channel.
23. In combination, a first eyeglass member having a first opening therein and a second eyeglass member having a second opening therein, and fastening means attaching said first eyeglass member to said second eyeglass member comprising:
 a bushing mounted in said first opening and at least partially into said second opening, said bushing including an interior channel open to an end portion of the bushing; and
 a pin for insertion through the second opening and into the interior channel of the bushing, said pin having a head and shank said shank having a plurality of barbs extending radially therefrom for engaging the channel walls wherein the plurality of barbs are laterally separated by longitudinal notches along the length of said shank and are angled to facilitate insertion into the channel and to prevent undesired removal of the pin from the bushing.

24. The combination of claim 23 wherein said bushing further includes a peripheral lip spaced from the channel opening.
25. The combination of claim 23 wherein said pin and barbs are fabricated of a metallic material.
26. The combination of claim 23 wherein the bushing is fabricated of a polymer.
27. The combination of claim 23 wherein the bushing is fabricated of nylon.
28. The combination of claim 23 wherein the first eyeglass member is a lens and the second eyeglass member is a temple hinge mounting-bracket or bridge.
29. The combination of claim 23 wherein the first eyeglass member is a bridge and the second eyeglass member is a lens.
30. The combination of claim 23 wherein the first eyeglass member is a temple hinge mounting-bracket and the second eyeglass member is a temple or lens.
31. A pair of eyeglasses having first and second members, said first member having a first opening therein and said second member having a second opening therein, and fastening means for attaching the first and second members together comprising:
 a bushing for insertion through said first opening and at least partially into said second opening, said bushing including an interior channel open to an end portion of the bushing; and
 a pin for insertion through the second opening and into the interior channel of the bushing, said pin having a head and shank said shank having a plurality of barbs extending radially therefrom for engaging the channel walls wherein the plurality of barbs are laterally separated by longitudinal notches along the length of said shank and are angled to facilitate insertion into the channel and to prevent undesired removal of the pin from the bushing.
32. The pair of eyeglasses of claim 31 wherein said bushing further includes a peripheral lip spaced from the channel opening.
33. The pair of eyeglasses of claim 31 wherein said pin and barbs are fabricated of a metallic material.
34. The pair of eyeglasses of claim 31 wherein the bushing is fabricated of a polymer.
35. The pair of eyeglasses of claim 31 wherein the bushing is fabricated of nylon.

UNITED STATES PATENT AND TRADEMARK OFFICE
CERTIFICATE OF CORRECTION

PATENT NO. : 6,682,192 B2
DATED : January 27, 2004
INVENTOR(S) : William A. Conner It is certified that error appears in the above-identified patent and that said Letters Patent is hereby corrected as shown below:

Column 8, line 21 to Column 12, line 16,

36. The pair of eyeglasses of claim 31 wherein the first eyeglass member is a lens and the second eyeglass member is a temple hinge mounting-bracket or bridge.
37. The pair of eyeglasses of claim 31 wherein the first eyeglass member is a bridge and the second eyeglass member is a lens.
38. The pair of eyeglasses of claim 31 wherein the first eyeglass member is a temple hinge mounting-bracket and the second eyeglass member is a temple or lens.
39. The pair of eyeglasses of claim 31 wherein the shank further includes a conical tip spaced from the head.
40. The pair of eyeglasses of claim 35 wherein the lip of the bushing includes a conical center point to facilitate removal.
41. The pair of eyeglasses of claim 38 wherein the second eyeglass member is a temple including a circular projection with a circular aperture on one end;
 said temple hinge mounting-bracket including a first projection near an upper surface and a second projection near a lower surface defining a recess therebetween;
 said first and second projections including circular apertures, such that said temple circular projection interposes within said recess permitting the bushing to be inserted at least partially through a first end of a passage defined by the aligned first and second projection apertures of the temple hinge mounting-bracket and the aperture of the temple projection; and
 said pin being insertable into a second end of the passage and into the bushing channel.
42. The pair of eyeglasses of claim 31 wherein a washer is positioned between said pin head and the surface of the second eyeglass member.

43. A fastening device for attaching together a first eyeglass member having a first opening therein and a second eyeglass member having a second opening therein comprising:
 a bushing for insertion through said first opening and at least partially into said second opening, said bushing including an interior channel open to an end portion of the bushing; and
 a pin for insertion through the second opening and into the interior channel of the bushing, said pin having a head and shank, said shank having a plurality of teeth extending therefrom for engaging the channel walls, wherein the teeth are sharply pointed, said teeth being spaced randomly along the length of the shank and directed to facilitate insertion into the channel and to prevent undesired removal of the pin from the bushing.
44. A fastening device for attaching together a first eyeglass member and a second eyeglass member having an opening therein comprising:
 said first eyeglass member including a stem extending therefrom for insertion into said opening, said stem including an interior channel open to an end portion of the stem; and
 a pin for insertion into the interior channel of the stem, said pin having a head and shank, said shank having a plurality of teeth extending therefrom for engaging the channel walls, wherein the teeth are sharply pointed, said teeth being spaced randomly along the length of the shank and directed to facilitate insertion into the channel and to prevent undesired removal of the pin from the stem.
45. A fastening device for attaching together a first eyeglass member having a first opening therein and a second eyeglass member having a having a second opening therein comprising:
 a bushing for insertion through said first opening and at least partially into said second opening, said bushing including an interior channel therethrough; and
 a pin for insertion through the second opening and into the interior channel of the bushing, said pin having a head and shank, said shank having a plurality of teeth extending therefrom for engaging the channel walls, wherein the teeth are sharply pointed, said teeth being spaced randomly along the length of the shank and directed to facilitate insertion into the channel and to prevent undesired removal of the pin from the bushing.

UNITED STATES PATENT AND TRADEMARK OFFICE
CERTIFICATE OF CORRECTION

PATENT NO. : 6,682,192 B2
DATED : January 27, 2004
INVENTOR(S) : William A. Conner It is certified that error appears in the above-identified patent and that said Letters Patent is hereby corrected as shown below:

Column 8, line 21 to Column 12, line 16,

46. A pair of eyeglasses having first and second members, said first member having a first opening therein and said second member having a second opening therein, and fastening means for attaching the first and second members together comprising:
a bushing for insertion through said first opening and at least partially into said second opening, said bushing including an interior channel open to an end portion of the bushing; and
a pin for insertion through the second opening and into the interior channel of the bushing, said pin having a head and shank, said shank having a plurality of teeth extending therefrom for engaging the channel walls, wherein the teeth are sharply pointed, said teeth being spaced randomly along the length of the shank and directed to facilitate insertion into the channel and to prevent undesired removal of the pin from the bushing.
47. In combination, a first eyeglass member having a first opening therein and a second eyeglass member having a second opening therein, and fastening means attaching said first eyeglass member to said second eyeglass member comprising:
a bushing mounted in said first opening and at least partially into said second opening, said bushing including an interior channel open to an end portion of the bushing; and
a pin for insertion through the second opening and into the interior channel of the bushing, said pin having a head and shank, said shank having a plurality of teeth extending therefrom for engaging the channel walls, wherein the teeth are sharply pointed, said teeth being spaced randomly along the length of the shank and directed to facilitate insertion into the channel and to prevent undesired removal of the pin from the bushing. --

Signed and Sealed this

Seventh Day of September, 2004

JON W. DUDAS
*Director of the United States Patent and Trademark Office*